(12) United States Patent
Takalo et al.

(10) Patent No.: US 6,922,554 B2
(45) Date of Patent: Jul. 26, 2005

(54) METHOD FOR IMPLEMENTING A TRANSCEIVER AND A TRANSCEIVER

(75) Inventors: Tomi-Pekka Takalo, Tampere (FI); Petri Heliö, Tampere (FI); Kalle Asikainen, Pirkkala (FI)

(73) Assignee: Nokia Mobile Phones Ltd., Espoo (FI)

(*) Notice: Subject to any disclaimer, the term of this patent is extended or adjusted under 35 U.S.C. 154(b) by 523 days.

(21) Appl. No.: 09/864,004

(22) Filed: May 23, 2001

(65) Prior Publication Data

US 2001/0049267 A1 Dec. 6, 2001

(30) Foreign Application Priority Data

May 30, 2000 (FI) .............................................. 20001299

(51) Int. Cl.$^7$ ................................................ H04B 1/10
(52) U.S. Cl. ...................... 455/307; 455/306; 455/84; 375/350; 375/278; 375/284
(58) Field of Search ................................ 455/303, 306, 455/307, 313, 314, 82, 83, 84, 85, 86; 375/219, 259, 285, 278, 284, 350, 229

(56) References Cited

U.S. PATENT DOCUMENTS 4,320,531 A * 3/1982 Dimon ........................ 455/203
5,701,594 A * 12/1997 Bath et al. ..................... 455/78

FOREIGN PATENT DOCUMENTS

| EP | 0 829 970 A2 | 3/1998 |
|----|--------------|--------|
| EP | 0 845 871 A2 | 6/1998 |
| EP | 0963053 A2 | 12/1999 |
| FI | 102432 B | 11/1998 |
| JP | 10013482 | 1/1998 |

* cited by examiner

*Primary Examiner*—Lee Nguyen
*Assistant Examiner*—Sanh Phu
(74) *Attorney, Agent, or Firm*—Perman & Green, LLP

(57) ABSTRACT

The invention relates to a method for implementing a transceiver, in which method radio-frequency signals are transmitted and received with a transceiver for communicating information. A radio-frequency signal received at a receiving stage is subjected to at least a first filtering step, in which a desired receiving signal is separated from the signal with a filter. A signal to be transmitted at a transmission stage is subjected to at least a second filtering step, in which a desired transmission signal is separated from the signal with a filter, to be transmitted. In the method, the same filter is used at least partly in said first and second filtering steps.

17 Claims, 4 Drawing Sheets

METHOD FOR IMPLEMENTING A TRANSCEIVER AND A TRANSCEIVER

The present invention relates to a method for implementing a transceiver according to the preamble of the appended claim 1, a transceiver according to the preamble of the appended claim 9, as well as a wireless communication device according to the preamble of the appended claim 17.

Figure 1:
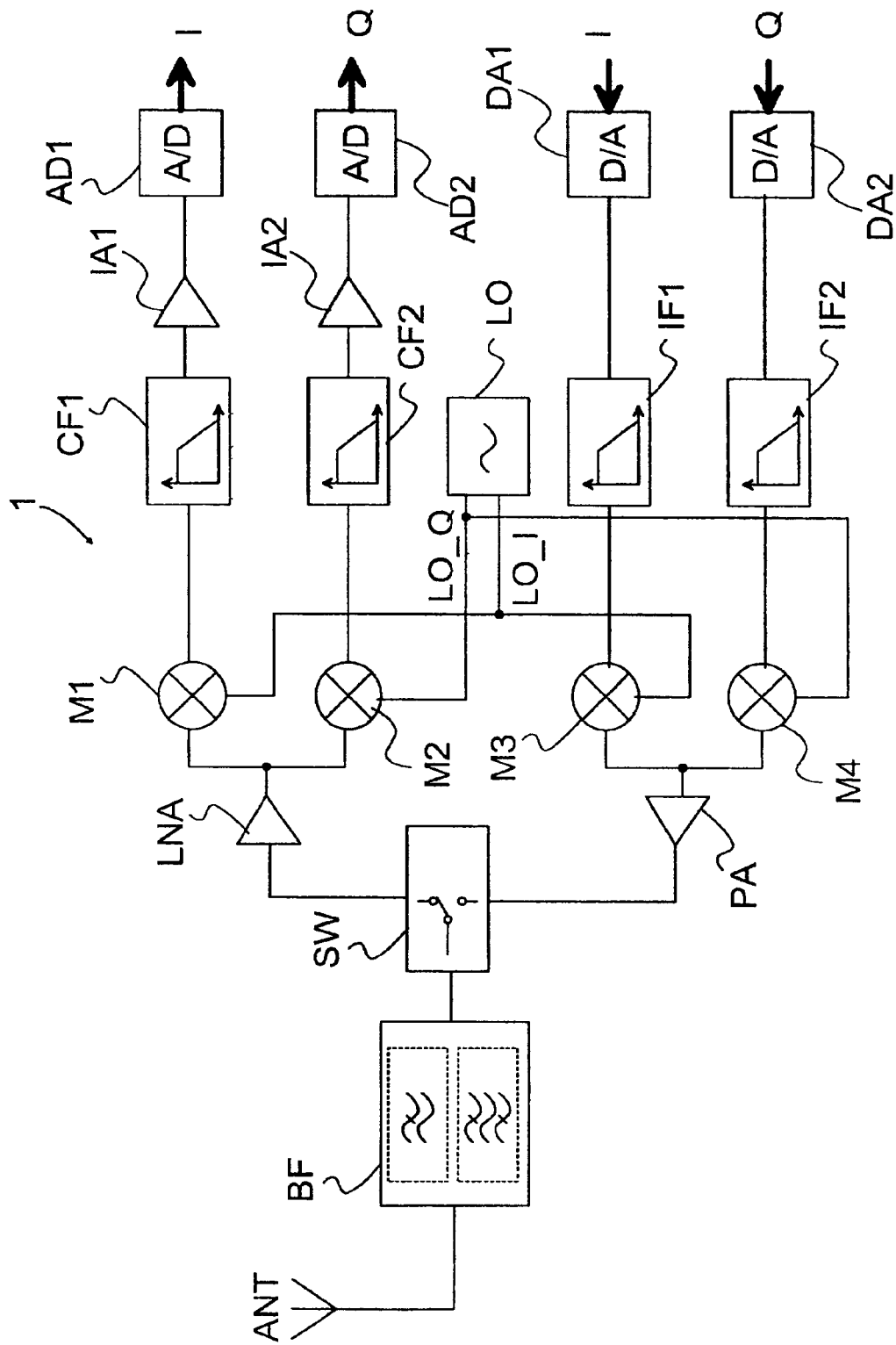

In wireless communication devices, transmitters and receivers are used to perform the necessary signal conversions for communication over the radio channel. The appended FIG. 1 shows a typical transmitter and receiver for radio communication. This transceiver is suitable, for example, for transmitting and receiving of digital information consisting of two signal components with a different phase. The first component I of digital information to be transmitted is input in a first digital-to-analog converter DA1, and the second component Q is input in a second digital-to-analog converter DA2. In the first digital-to-analog converter DA1, the first component I of the information to be transmitted is converted into analog format, and, respectively, the second digital-to-analog converter DA2 is used to convert the second component Q of the information to be transmitted to analog format. After this, the analog components are subjected to rejection of image-frequency signals in a first and a second image frequency filter IF1, IF2. One function of these image-frequency filters is to reject the frequencies caused by harmonic frequencies of the clock frequency of the digital-to-analog converter in the output signal and also to reduce quantization noise generated in the digital-to-analog converter.

The filtered signal components are led to a third and a fourth mixer N3, N4, in which the signals are mixed with a local oscillator signal LO. After this, the mixing results are led to an output amplifier PA to be amplified and led via an antenna switch SW to a channel filter BF and an antenna ANT.

In a corresponding manner, a signal to be received via the antenna ANT is filtered in a channel filter BF and led via an antenna switch SW to a low-noise amplifier LNA of the receiver. The amplified received signals are divided into two signal branches. The function of the first signal branch is to modulate a first signal component I of the received signal and the function of the second signal branch is to modulate a second signal component Q of the received signal. The signal received in the first signal branch is mixed with a first phase LO_I of the local oscillator signal in a first mixer M1. In a second mixer M2, a second phase LO_Q of the local oscillator signal is mixed with the received signal. The phase difference between the first LO_I and the second phase LO_Q of the local oscillator signal is preferably about 90°. After this, as the mixing result, two signal components I, Q of the transmitted signal are obtained from the mixers M1, M2, with a phase shift of about 90 degrees therebetween. These signal components I, Q are led into a channel selection filter CF1, CF2, in which the signal components corresponding to the desired receiving channel frequency are derived from the signal components.

The signals passed through the channel selection filters are amplified in an intermediate amplifier IA1, IA2, after which the amplified signals are converted to digital format in first and second analog-to-digital converters AD1, AD2.

One problem in such a transceiver of prior art is the fact that the implementation of an image filter, particularly on an integrated circuit, requires a relatively large area on the circuit and increases the price of the transceiver. Furthermore, such an image filter consumes electric power, which causes problems particularly in portable wireless communication devices.

It is an aim of the present invention to provide a method for implementing a transceiver, as well as a transceiver in which the necessary filters can be implemented in a simpler manner, with a smaller number of components and, when using integrated circuits, on a smaller circuit area. The method according to the present invention is characterized in what will be presented in the characterizing part of the appended claim 1. The transceiver according to the present invention is characterized in what will be presented in the characterizing part of the appended claim 9. Further, the wireless communication device according to the invention is characterized in what will be presented in the characterizing part of the appended claim 17. The invention is based on the idea that the channel selection filter of the receiver is used as an image filter.

Using the present invention, considerable advantages are achieved when compared with solutions of prior art. By the method of the invention, the transceiver can be implemented with a smaller number of components than transceivers of prior art. Furthermore, when integrated circuits are used, less surface area is required on the circuit than when using solutions of prior art.

Figure 2:
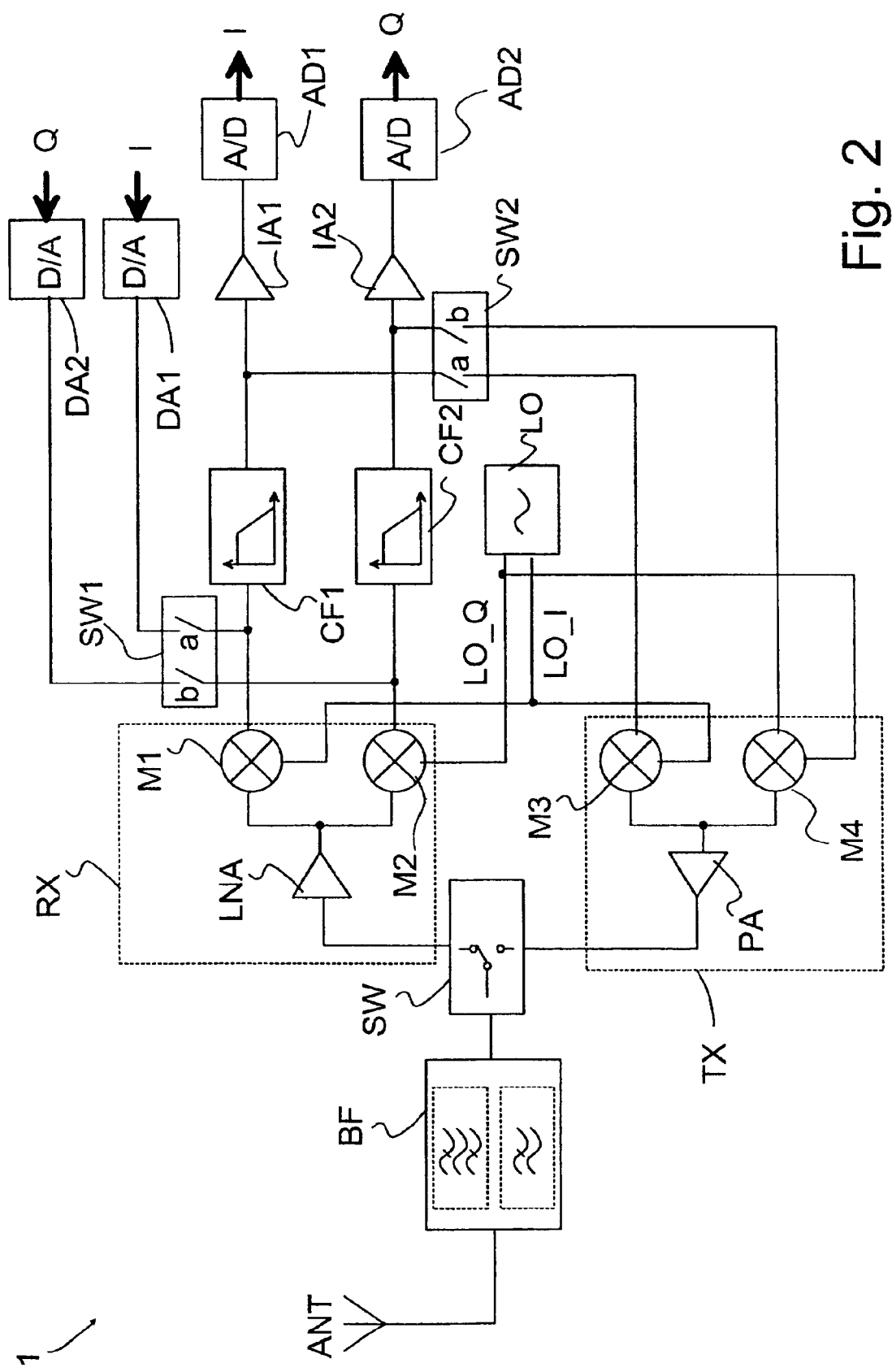
Figure 3:
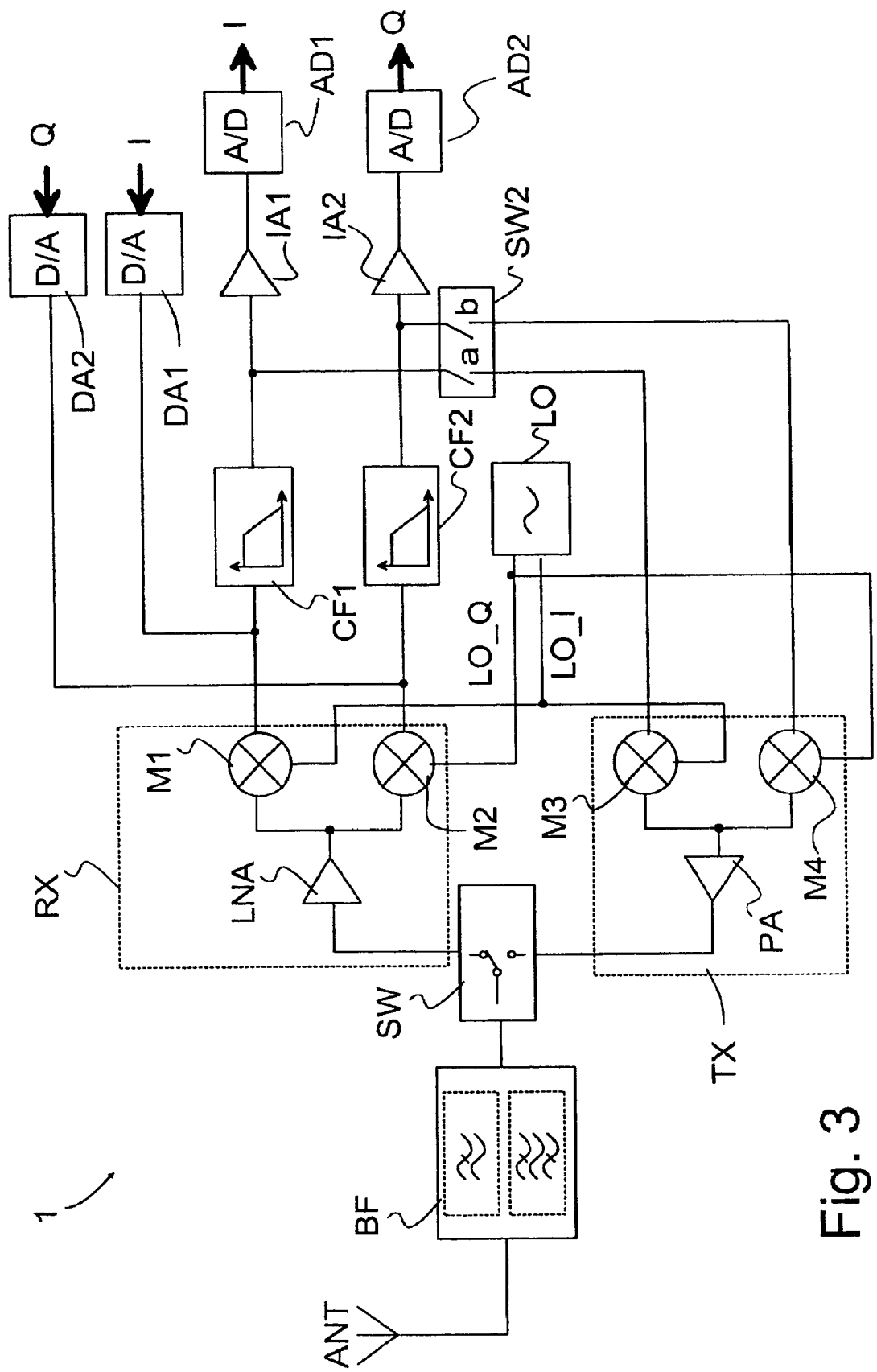
Figure 4:
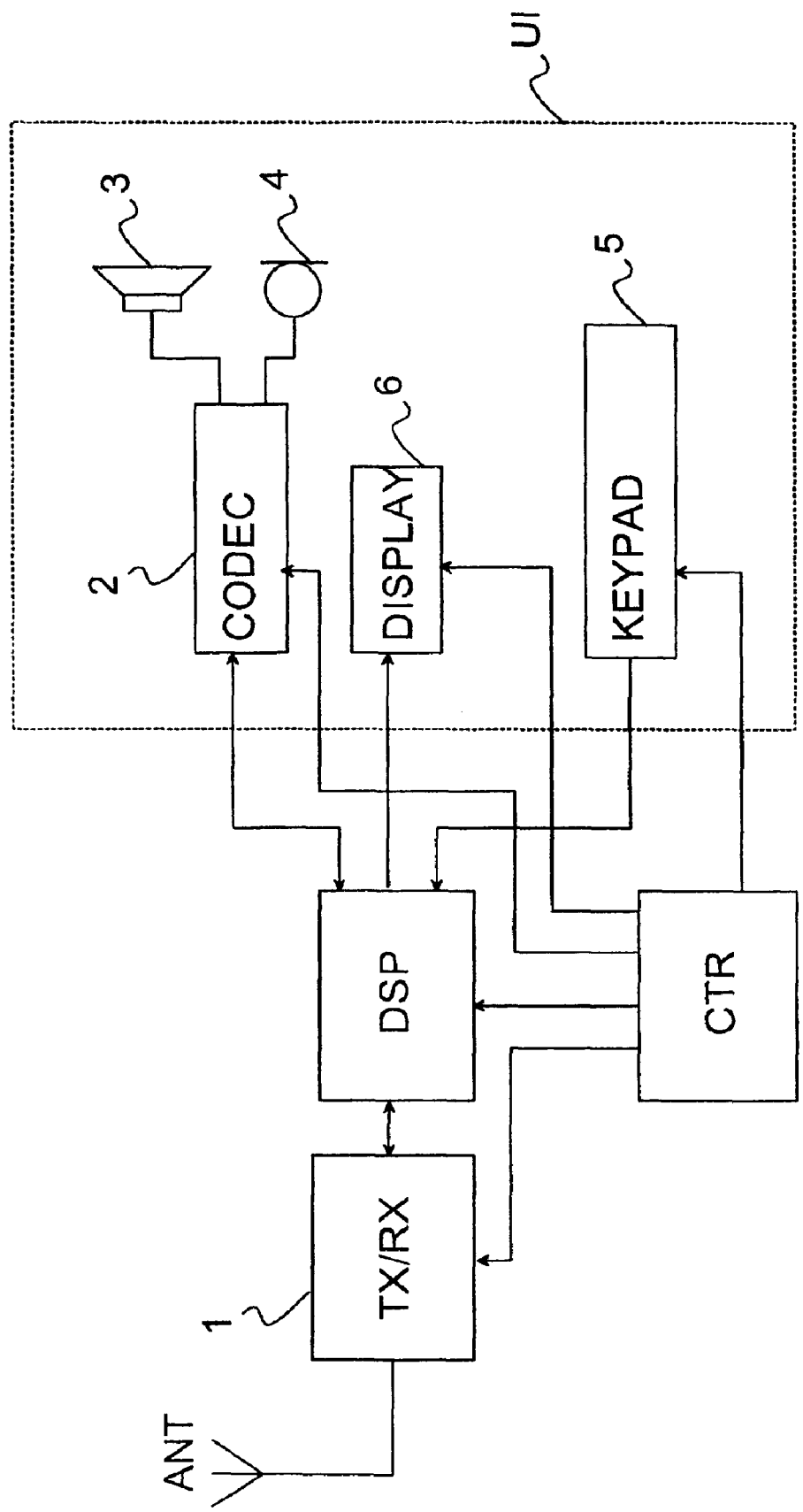

In the following, the invention will be described in more detail with reference to the appended drawings, in which FIG. 1 shows a transceiver according to prior art, FIG. 2 shows a transceiver according to an advantageous embodiment of the invention, and FIG. 3 shows a transceiver according to another advantageous embodiment of the invention, and FIG. 4 shows a wireless communication device according to an advantageous embodiment of the invention in a reduced block chart.

In the following, the invention will be described in connection with a transceiver 1 according to an advantageous embodiment of the invention as shown in FIG. 2. The receiver of FIG. 2 is intended for transmitting and receiving biphase digital signals, wherein the signals comprise two components I, Q of different phases, but it is obvious that the invention can be applied in transmitting and receiving signals of other types as well. The transceiver 1 of FIG. 2 comprises an antenna ANT, a channel filter BF, an antenna switch SW, a transmitter part TX, a receiver part RX, and a local oscillator LO. The transceiver also comprises a control block CTR. This control block CTR is used to control e.g. the operation of the selecting switches SW1, SW2 in transmission and reception.

At the stage of receiving, the selecting switches SW1, SW2 are set in a first position, as shown in the block chart of FIG. 2. Thus, signals received via the antenna ANT are led into the channel filter BF which preferably comprises, for signals to be received, a band-pass filter through which substantially only the signals of the receiving frequency range defined in the system are passed to the antenna switch SW. From the antenna switch SW, these signals are led to be amplified in a low-noise amplifier LNA, after which the amplified signal is led into first and second mixers M1, M2. To these mixers M1, M2 is also led the local oscillator signal formed by the local oscillator LO. The local oscillator signal $LO_I$ to be led to the first mixer M1 and the local oscillator signal $LO_Q$ to be led to the second mixer M2 have a phase difference of preferably about 90 degrees, to separate the two signal components I, Q from each other.

As a result of mixing, the output obtained from the first mixer M1 is the first signal component I at an intermediate frequency or, in a direct conversion receiver, at the baseband. This first signal component I is led to a channel selection filter CF1 for band-pass filtering, if the first signal component I is an intermediate frequency signal, or preferably for low-pass filtering, if the first signal component I has been mixed directly to a baseband signal in the mixer M1. The function of this channel selection filter CF1 is e.g. to pass only a signal of a desired receiving channel to the other stages in the receiver. In this transceiver structure of FIG. 2, the signal filtered in the channel selection filter CF1 is led to an amplifier AMP1 to be amplified and led to a first analog-to-digital converter AD1. The first analog-to-digital converter is used to convert the analog first signal component I to digital form. In a corresponding manner, as a mixing result from the second mixer M2, a second signal component Q is obtained, either at an intermediate frequency or at the baseband. This second signal component Q is also subjected to filtering in a channel selection filter CF2 as well as amplification in a second amplifier AMP2 before converting this second signal component Q to digital form in a second analog-to-digital converter AD2. The signals I, Q converted to digital format are further led to stages of further processing in a way known as such. It is not necessary to describe these further processing stages in more detail in this context.

At the stage when it is desired to transmit a signal on the radio channel, the control block CTR sets the switches SW1, SW2 in a second position, wherein the following steps are taken. The bicomponent signal I, Q in digital form is converted to an analog signal. The first and second signal components I and Q are converted to analog form in first and second digital-to-analog converters DA1, DA2, respectively. After this, the analog signal formed of the first signal component I is led via the first switch SW1 to the first channel selection filter CF1, and the analog signal formed of the second signal component Q is led via the second switch SW2 to the second channel selection filter CF2. The first channel selection filter CF1 and the second channel selection filter CF2, respectively, are used for filtering out possible image-frequency signals caused by the clock of the digital-to-analog converter as well as quantization noise generated in the digital-to-analog conversion.

The filtered analog signal of the first signal component I is led from the first channel selection filter CF1 via the second switch SW2 to a third mixer M3. The third mixer M3 is used for mixing the first signal component I with the first local oscillator frequency $LO_I$. The output of the third mixer M3 is thus a modulated, preferably transmission-frequency signal which is led to an output amplifier PA.

The filtered analog signal of the second signal component Q is led from the second channel selection filter CF2 via the second switch SW2 to a fourth mixer M4. The fourth mixer M4 is used for mixing the second signal component Q with the second local oscillator frequency $LO_Q$. The output of the fourth mixer M4 is thus a modulated, preferably transmission-frequency signal which is led to the output amplifier PA.

In the output amplifier PA, the amplified signals are led via the antenna switch SW to the channel filter BF and further to the antenna ANT. The channel filter BF is preferably provided with a low-pass filter for the signal to be transmitted, to secure that no signals harmonic with the transmission signal are passed to the antenna.

In a transceiver of the invention, it is thus possible utilize the channel selection filter CF1, CF2 of the receiver also at the transmission stage. Thus, no separate image filter will be needed for the transmitter. Because the implementation of filters in integrated circuits requires a relatively large surface area on the circuit, this arrangement of the invention can be used to implement the transceiver with a smaller circuit area.

The switches SW1, SW2 required in the operation of the transceiver 1 according to the invention can be advantageously implemented as semiconductor switches or the like in a way known as such. These switches SW1, SW preferably comprise two switching elements SW1a, SW1b; SW2a, SW2b; that is, they constitute a pair of switches. Thus, the first element SW1a, SW2a of the pair of switches is used for coupling the first signal component I, and the second switching element SW1b, SW2b is used for coupling the second signal component Q, respectively.

The channel selector filters CF1, CF2 used are preferably channel selector filters of prior art. Typically, the requirements for the channel selection filter CF1, CF2 of the receiver are significantly stricter than the requirements of the filter needed for transmission, wherein a filter complying with the properties needed for receiver functions is also well suited for an implementation according to the invention, to be used also for filtering of a signal to be transmitted. In the parameters of designing the filter, this is manifested e.g. in such a way that the number of poles of the receiving filter is greater than the number of poles of the filter fulfilling the transmission criteria. This is due e.g. to the fact that when filtering the receiving channel, an attempt must be made to suppress possible signals on adjacent receiving channels so that they will not interfere with the desired signal to be received. On the other hand, the clock frequency of the digital-to-analog converter DA1, DA2 is normally selected to be so high that image frequencies can be easily filtered out with a simple and relatively inaccurate filter. However, in a situation in which image filtering is also used for filtering of the quantization point formed in the digital-to-analog conversion, the requirements of the filter must be set slightly higher than what is necessary for the filtering of image frequencies. If quantization noise is strong at an adjacent or another frequency than the transmission channel frequency, this image filtering must be capable of rejecting or at least significantly suppressing this quantization noise which might otherwise be passed to the antenna and interfere with other communication devices. Typically, the channel selection filter CF1, CF2 of the receiver is also calibrated, due to the high demands set on the filter.

FIG. 3 shows a transceiver according to another advantageous embodiment of the invention in a reduced block chart. With respect to its main parts and functions, this transceiver corresponds to the operation of the transceiver according to the first advantageous embodiment of the invention. A substantial difference here lies in that the digital-to-analog converters can be used for eliminating DC offset voltage in a receiver of direct conversion type. Thus, preferably the control block CTR sets in the first digital-to-analog converter DA1 a control whereby in the output of the first digital-to-analog converter DA1 a voltage is generated which substantially corresponds to the DC offset voltage in the output of the first mixer M1 but has an opposite direction. Furthermore, the control block CTR disconnects the switch SW1. Thus, only the desired received information signal is substantially led to the first channel selection filter CF1. In a corresponding manner, the second digital-to-analog converter DA2 can be used to eliminate a possible DC offset voltage in the output of the second mixer M2 in a receiver of direct conversion type. By this arrangement, it is possible to avoid the need for separate digital-to-analog converters to eliminate the DC offset voltage in a receiver of direction conversion type, wherein the number of necessary components is reduced and surface area is significantly saved on integrated circuits. In this embodiment, the first pair of switches SW1 is not necessary, because the digital-to-analog converter is used during both the transmission and the reception.

Further, FIG. 4 shows a wireless communication device MS according to an advantageous embodiment of the invention. It comprises a transceiver unit 1, a control unit CTR, a user interface UI preferably comprising an audio codec 2, an earpiece and/or speaker 3, a microphone 4, a keypad 5 and a display 6, as well as a digital signal processing unit DSP for processing signals received and to be transmitted. Furthermore, the digital signal processing unit DSP can be used to implement at least some of the filters required in the transceiver, such as the channel selection filters. However, it is obvious that the filters can also be implemented with separate filter circuits or other solutions known as such. The digital signal processing unit DSP and the control block CTR can also be used in other operations of the wireless communication device, such as in the control of the display 6 and the keypad 5, which is known as such.

The present invention is suitable for use in such communication systems in which transmission and reception take place at different times. Such systems include e.g. time division multiple access (TDMA) systems, such as the GSM mobile communication system. The invention can also be applied in systems in which the signal to be transmitted comprises only one component, or more than the two signal components I, Q mentioned in the preferred embodiments above.

It is obvious that the present invention is not limited solely to the embodiments presented above, but it can be modified within the scope of the appended claims.

What is claimed is:

1. A method for implementing a transceiver, in which method radio-frequency signals are transmitted and received with a transceiver for communicating information, wherein a radio-frequency signal received at a receiving stage is subjected to at least a first filtering step, in which a desired receiving signal is separated from the signal with a common filter, and a signal to be transmitted at a transmission stage is subjected to at least a digital-to-analog conversion and a second filtering step, in which a desired transmission signal is separated with said common filter from the signal to be transmitted and from quantization noise formed in the digital-to-analog conversion.

2. The method according, to claim 1, characterized in that at the receiving step, also at least a second filtering step is performed, in which the received signal is subjected to rejection of signals outside of the receiving frequency range substantially defined for the system.

3. The method according to claim 1, characterized in that at the receiving stage, also at least a first conversion step is taken, in which the received analog signal is converted to digital form.

4. The method according to claim 3, characterized in that at the transmission stage, also at least a second conversion step is taken, in which the digital signal to be transmitted is converted to analog form.

5. The method according to claim 3, characterized in that at the receiving stage, before the first filtering step, at least a first mixing step is taken, in which the received radio-frequency signal is mixed with a local oscillator signal.

6. The method according to claim 5, characterized in that the received signal is converted at the first mixing step to a baseband signal.

7. The method according to claim 6, characterized in that the method also comprises elimination of a DC offset voltage from the signal formed in the first mixing step.

8. The method according to claim 5, characterized in that the received signal is converted in the first mixing step to at least one intermediate frequency.

9. A transceiver comprising transmission means for transmitting radio-frequency signals and receiving means for receiving radio-frequency signals, which receiving means comprise filtering means for filtering the received radio-frequency signal to separate a desired receiving signal, and which transmission means comprise at least a digital-to-analog converter for performing a digital-to-analog conversion to a signal to be transmitted, and filtering means for separating a desired transmission signal to be transmitted as a radio-frequency signal, said filtering means of said transmission means and said filtering means of said receiving means comprising at least partly a common filter adapted to perform said filtering of the received radio-frequency signal and filtering of quantization noise formed in the digital-to-analog conversion from the desired transmission signal.

10. The transceiver according to claim 9, characterized in that it also comprises at least a band filter to reject signals outside of the receiving frequency range substantially defined in the system, from the received signal.

11. The transceiver according to claim 9, characterized in that it also comprises means for converting the received analog signal to digital form.

12. The transceiver according to claim 11, characterized in that it also comprises at least means for converting the digital signal to be transmitted to analog form.

13. The transceiver according to claim 11, characterized in that it also comprises at least one mixer to mix a local oscillator signal with the received radio-frequency signal.

14. The transceiver according to claim 13, characterized in that the received signal is arranged to be converted in said mixer to a baseband signal.

15. The transceiver according to claim 14, characterized in that said means for converting the digital signal to be transmitted to analog form is also used for eliminating a DC offset voltage from the signal formed in said mixer.

16. The transceiver according to claim 13, characterized in that the received signal is arranged to be converted in said mixer to at least one intermediate frequency.

17. A wireless communication device comprising transmission means for transmitting radio-frequency signals and receiving means for receiving radio-frequency signals, which receiving means comprise filtering means for filtering the received radio-frequency signal to separate a desired receiving signal, and which transmission means comprise at least a digital-to-analog converter for performing a digital-to-analog conversion to a signal to be transmitted, and filtering means for separating a desired transmission signal to be transmitted as a radio-frequency signal, said filtering means of said transmission means and said filtering means of said receiving means comprising at least partly a common filter adapted to perform said filtering of the receiving radio-frequency signal and filtering of quantization noise formed in the digital-to-analog conversion from the desired transmission signal.

* * * * *